United States Patent [19]
Heglund et al.

[11] Patent Number: 5,493,195
[45] Date of Patent: Feb. 20, 1996

[54] SWITCHED RELUCTANCE STARTER/GENERATOR CONTROL SYSTEM ALLOWING OPERATION WITH REGENERATIVE LOADS AND ELECTRICAL SYSTEM EMPLOYING SAME

[75] Inventors: William S. Heglund, Davis Junction; Caio A. Ferreira, Rockford, both of Ill.

[73] Assignee: Sundstrand Corporation, Rockford, Ill.

[21] Appl. No.: 315,168

[22] Filed: Sep. 29, 1994

[51] Int. Cl.⁶ ........................................... H02P 1/46
[52] U.S. Cl. ..................... 318/701; 318/204; 318/138; 318/439
[58] Field of Search ..................... 318/701, 254, 318/138, 439; 290/48, 51

[56] References Cited

U.S. PATENT DOCUMENTS

| | | | |
|---|---|---|---|
| 4,401,926 | 8/1983 | Marton et al. | 318/138 |
| 4,562,389 | 12/1985 | Jundt et al. | 318/701 |
| 4,611,157 | 9/1986 | Miller et al. | 318/696 |
| 4,642,543 | 1/1987 | MacMinn | 318/696 |
| 4,684,867 | 8/1987 | Miller et al. | 318/701 |
| 4,692,674 | 9/1987 | Packard et al. | 318/254 |
| 4,707,650 | 11/1987 | Bose | 318/685 |
| 4,713,594 | 12/1987 | Bose et al. | 318/685 |
| 4,959,797 | 9/1990 | McIntosh | 318/138 |
| 4,969,596 | 9/1990 | MacMinn et al. | 318/254 |
| 5,012,171 | 4/1991 | Sember | 318/696 |
| 5,012,172 | 4/1991 | Sember | 318/696 |

Primary Examiner—William M. Shoop, Jr.
Assistant Examiner—Karen Masih
Attorney, Agent, or Firm—Jeffery J. Makeever

[57] ABSTRACT

An electric power generating system comprises a switched reluctance machine, an inverter having a dc input/output coupled to a dc bus, switches responsive to switching control signals for coupling each of the machine's phase windings to the dc bus, and diodes for cross-coupling each of the phase windings to the dc bus. A controller having a number of control inputs and outputs coupled to the inverter monitors the current flowing in the phase windings and the voltage level on the dc bus, and calculates a maximum and a minimum phase current control signal. The controller modulates the switching control signals to regulate the phase current within a range defined by these control signals to maintain the voltage level at a desired level. Upon calculating a positive phase current control signal, the controller generates switching control signals to enable switches at a fixed angle prior to alignment, and generates switching control signals to disable the switches at a fixed angle after alignment. In this way, the machine generates sufficient electric power to maintain the voltage level at the desired level. Upon calculating a negative phase current control signal, the controller generates switching control signals to enable the switches at a fixed angle prior to alignment, and generates switching control signals to disable one switch at a fixed angle prior to alignment. In this way, the machine dissipates sufficient electric power to maintain the voltage at the desired level.

11 Claims, 14 Drawing Sheets

SWITCHED RELUCTANCE STARTER/GENERATOR CONTROL SYSTEM ALLOWING OPERATION WITH REGENERATIVE LOADS AND ELECTRICAL SYSTEM EMPLOYING SAME

FIELD OF THE INVENTION

The instant invention relates to control systems for switched reluctance starter/generators, and more particularly to a control system for a switched reluctance starter/generator which allows operation of same in the presence of regenerative loads.

BACKGROUND ART

The continuing advances in power electronics and control algorithms are allowing new electrical solutions to be developed for many systems which, in the past, have been dependant on mechanical or hydraulic technologies. As these new systems are developed and integrated with other systems, new requirements and problems are realized which must be addressed. When one of these new systems is integrated into an aerospace application, a subset of the problems concerns the electrical power generating system (EPGS) from which input power is drawn. Input and power feedback characteristics of the new subsystems, if not properly accounted for, could effect other systems which are also coupled to the EPGS.

One such system used in aerospace applications is an electric actuation system. This system typically comprises an electric motor and motor drive used to control an external surface, such as a flap or spoiler, which is driven by external forces, such as the wind. This system exhibits the characteristics of a regenerative load during periods of its operation, and actually generates electric power which is supplied back to the distribution bus. This excess power can result in an over voltage condition, possibly damaging other systems connected to the distribution bus.

The most common approach for handling the power produced by the regenerative load is to dissipate the fed back power, in a controlled manner, in a resistive element somewhere on the distribution bus. Although effective, the weight and cooling requirements of the dissipative element itself, its controller and the power switches used to control the dissipation, as well as the necessity of fault tolerance, make this approach undesirable. The reason for this undesirability is that, in an aircraft application, each additional pound of equipment relates directly to increased fuel burn, reduced range, and increased operating cost. It is a primary concern of airframe manufacturers and electric system designers, therefore, that the EPGS be light weight, fault tolerant, and capable of maintaining the distribution bus voltage within acceptable parameters, even in the presence of regenerative loads.

To address the concern of weight and reliability, many newer electric power generating systems are being designed utilizing switched reluctance machines which, in addition to providing quality electric power to the distribution bus during the generation mode, also integrate the function of providing starting torque to the engine to eliminate the need for a separate starter, thus realizing a significant weight savings. While these machines are capable of operating in both a start and a generate mode (bi-directional mechanical/electrical energy transformation), the control of these machines to date has not provided an adequate solution to the problem of regenerative power loads. While most control algorithms provide adequate bus voltage control during the generate mode of operation, no control algorithm provides for bus voltage control in the presence of a regenerative load whose magnitude is such that a net negative flow of electrical energy is required of the switched reluctance machine.

The instant invention, however, is directed at overcoming these problems by providing and electric power generating system utilizing a high reliability switched reluctance machine and a control therefore which will maintain the distribution bus voltage within acceptable parameters in the presence of both dissipative and regenerative loads, even during operation where the power returned to the distribution bus exceeds that which is required by the dissipative loads.

SUMMARY OF THE INVENTION

It is the principle objective of the instant invention to provide a new and improved electrical power generation system. More specifically, it is the objective of the instant invention to provide a new and improved switched reluctance machine based electric power generation system and control therefore which will provide output voltage regulation in the presence of regenerative loads which may require a net negative electric power flow through the switched reluctance machine to maintain the bus voltage within acceptable parameters. Further, it is an objective of the instant invention to provide within the control the ability to operate the switched reluctance machine in a starting mode whereby torque is controlled to provide engine starting capability.

In an embodiment of the instant invention, the electric power generating system for converting mechanical energy from a prime mover to electrical energy which is distributed by a dc bus to utilization equipment for use thereby comprises a switched reluctance machine having a rotor drivably coupled to the prime mover by a shaft, and a stator having a number of salient stator poles wound with phase windings. The rotor also has a number of salient rotor poles. The generating system further comprises an inverter having a dc input/output coupled to the dc bus, and at least a first and a second switch responsive to switching control signals for coupling each of the stator's phase windings to the dc bus. The inverter further comprises at least a first and a second diode for cross-coupling each of the phase windings to the dc bus to allow current flow back when the switches are disabled. A controller having a number of control inputs and outputs coupled to the inverter monitors and controls system performance.

In this embodiment of the instant invention, the controller continuously monitors the current flowing in the phase windings and the voltage level on the dc bus. The controller then calculates a variable maximum phase current control signal and a variable minimum phase current control signal. The controller modulates the switching control signals to regulate the phase current within a range defined by the variable maximum phase current control signal and the variable minimum phase current control signal, thus maintaining the voltage level on the dc bus at a desired level. Upon calculating a positive maximum phase current control signal, the controller generates switching control signals to enable at least the first and the second switch for each of the phase windings at a first fixed angle prior to alignment of the rotor pole with the phase winding's associated stator pole, and further generates switching control signals to disable at least the first and the second switch at a second fixed angle after alignment of the rotor pole with the phase winding's associated stator pole. In this way, the switched reluctance machine generates sufficient electric power to maintain the voltage on the dc bus at the desired level in the presence of a net dissipative load. Upon calculating a negative maximum phase current control signal, the controller generates switching control signals to enable at least the first and the second switch for each of the phase windings at a third fixed angle prior to alignment of the rotor pole with the phase winding's associated stator pole, and further generates the switching control signals to disable at least the second switch at a fourth fixed angle prior to alignment of the rotor pole with the phase winding's associated stator pole. In this way, the switched reluctance machine dissipates sufficient electric power to maintain the voltage level on the dc bus at the desired level in the presence of a net regenerative load.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
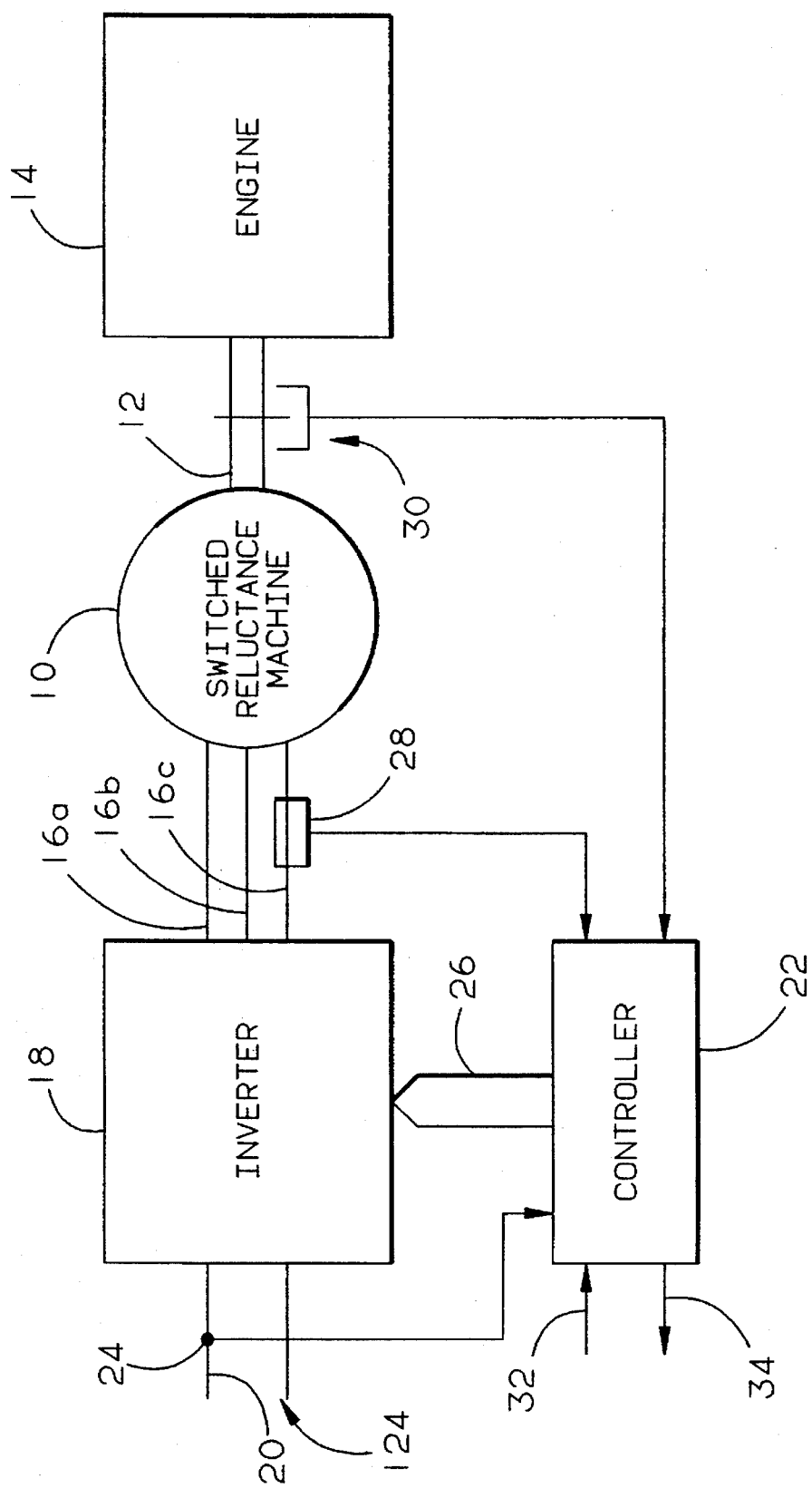
FIG. 1 is a system level block diagram to which the instant invention is particularly applicable.

An embodiment of the electric power generating system of the instant invention, as illustrated in FIG. 1, comprises a switched reluctance machine 10 having a rotor (not shown) drivably coupled by shaft means 12 to a turbine engine 14. The shaft means 12 may preferably provide direct coupling to the engine 14, or may provide coupling through appropriate gearing or differentials as desired. Additionally, the shaft means 12 may be integral to the engine and the switched reluctance machine 10 provided integrally therein. The machine 10 is electrically coupled by a plurality of phase leads 16a, 16b, 16c to an inverter 18, which is electrically coupled by a dc input/output 124 to a dc distribution bus 20. A controller 22 monitors this dc distribution bus 20 at a point of regulation 24, and provides control signals 26 to the inverter 18. Current sensing means 28 are used to monitor current flow in the phase leads 16a, 16b, 16c, and rotor position resolving means 30 are used to monitor rotor position and speed. As will be recognized by one skilled in the art, resolution of the rotor position and speed may be by electronic means as well as through a resolver. External system communications, including control inputs 32 and status outputs 34, are also provided through the controller.

This system is preferably a high voltage dc system, although the concepts described herein have equal applicability to a dc link variable speed constant frequency (VSCF) system. Preferably, the electric power generating system described herein is a 270 volt dc system with power quality as defined by applicable industry standards, such as MIL-STD704E and others. The control for this system allows hi-directional electric power flow to maintain this power quality in the presence of both net dissapative and net regenerative loads.

Figure 2:
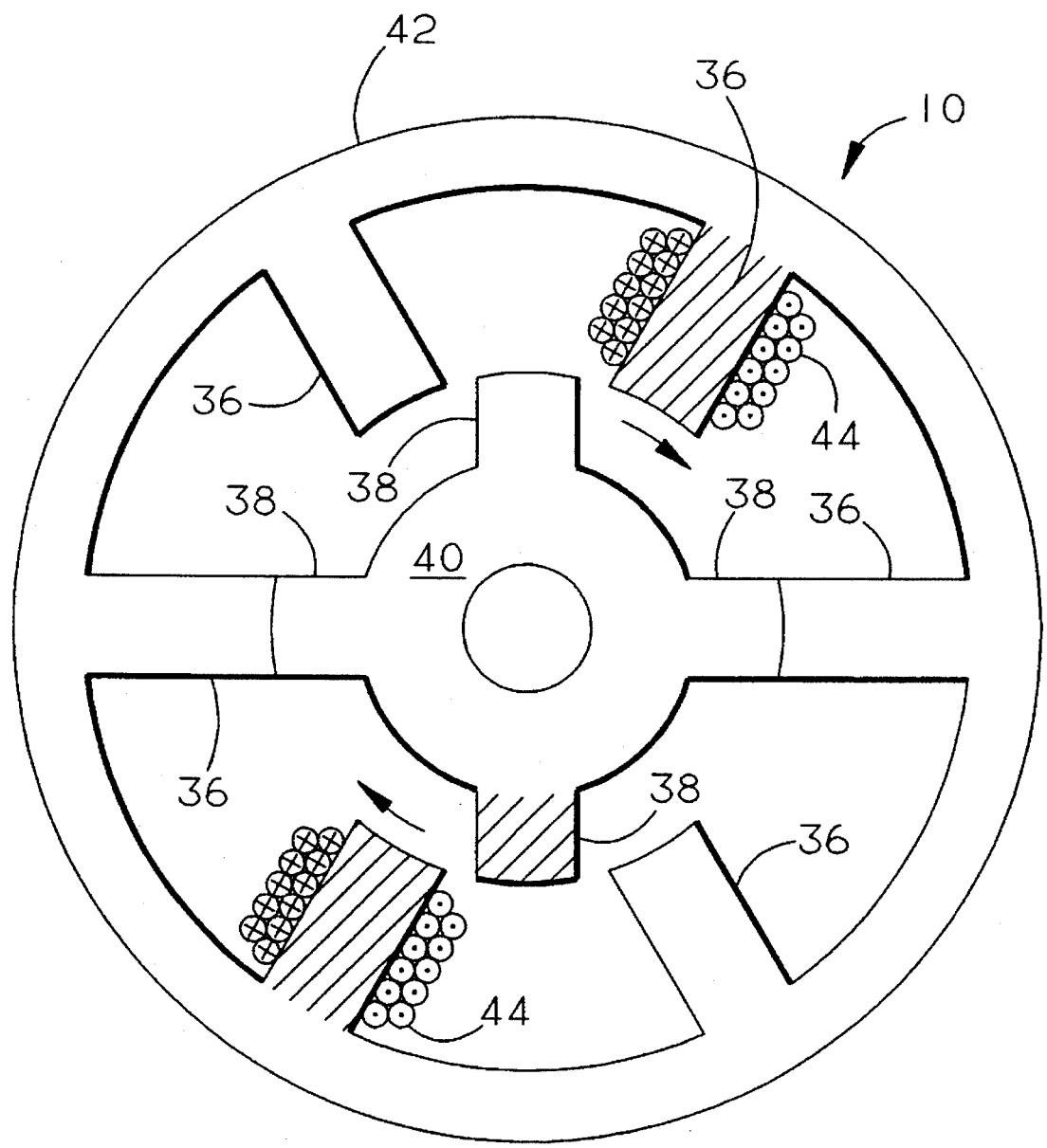
FIG. 2 is a diagrammatic cross section of a switched reluctance machine applicable to the instant invention.

The switched reluctance machine topology, as illustrated by the cross section of FIG. 2, utilizes a first plurality of salient stator poles 36 and a second plurality of salient rotor poles 38. Advantageously, a 6/4 topology having six stator poles 36 and four rotor poles 38 is used. As is recognized by one skilled in the art, a different topology could be utilized with corresponding changes in the inverter 18 and the controller 22 without departing from the scope of the invention. Both the rotor 40 and the stator 42 are made of thin, high strength iron laminations (not shown) to keep iron losses to a minimum. It has been found that vanadium iron cobalt (2V49FeCo) provides acceptable characteristics. The stator windings 44 consist of Litz conductors to minimize the eddy current losses associated with the maximum fundamental operating frequency, although solid copper or hollow liquid cooled conductors may also be used. The laminations (not shown) are carefully annealed to obtain the desired magnetic and mechanical properties. The dc magnetization, ac core losses, and the mechanical tensile properties play a fundamental role in the design of the machine 10, and must be taken into account in the thermal, stress and electromagnetic analysis. At lower speeds the output power is limited by the engine characteristics. At high speed friction and windage losses become the dominant factor in machine efficiency. As expected, higher efficiencies are obtained at higher power levels.

Figure 3:
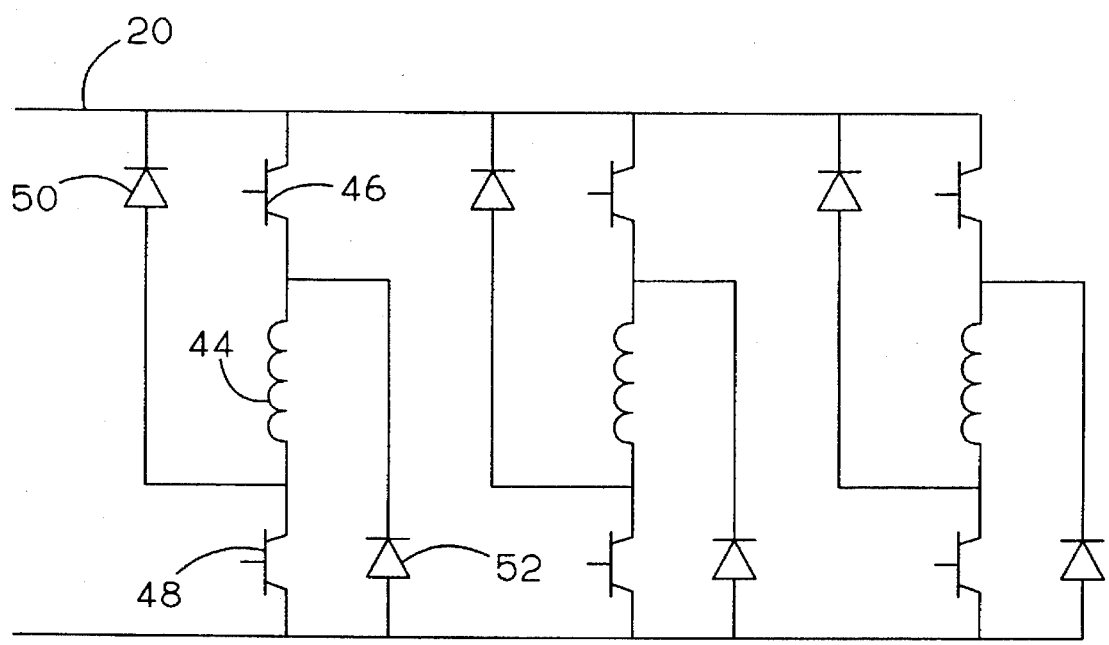
FIG. 3 is a single line schematic diagram of an embodiment of the instant invention.

Referring back to FIG. 1, the inverter 18 is also capable of receiving power from the dc distribution bus 20 to perform engine starting as is known in the art, in addition to providing voltage regulation on the dc distribution bus 20 during generation mode, thus realizing a greater system weight savings through further integration. The inverter topology (bridge topology), as illustrated in FIG. 3, comprises switching means, such as the two switches 46, 48, and commutation means, such as the two diodes 50, 52, for each stator pole phase winding 44. Each phase of the inverter 18 is identical, and, therefore, only one phase will be described in detail herein. The switched reluctance machine phase winding 44 is in series with both switches 46, 48. As the switches 46, 48 are gated into conduction or enabled, current flows from the dc distribution bus 20 to energize the winding 44. When the switches 46, 48 are gated out of conduction or disabled, the current is forced to communicate through the cross-coupled diodes 50 and 52 because the direction and magnitude of current flow through the winding 44 cannot change instantaneously.

Figure 4:
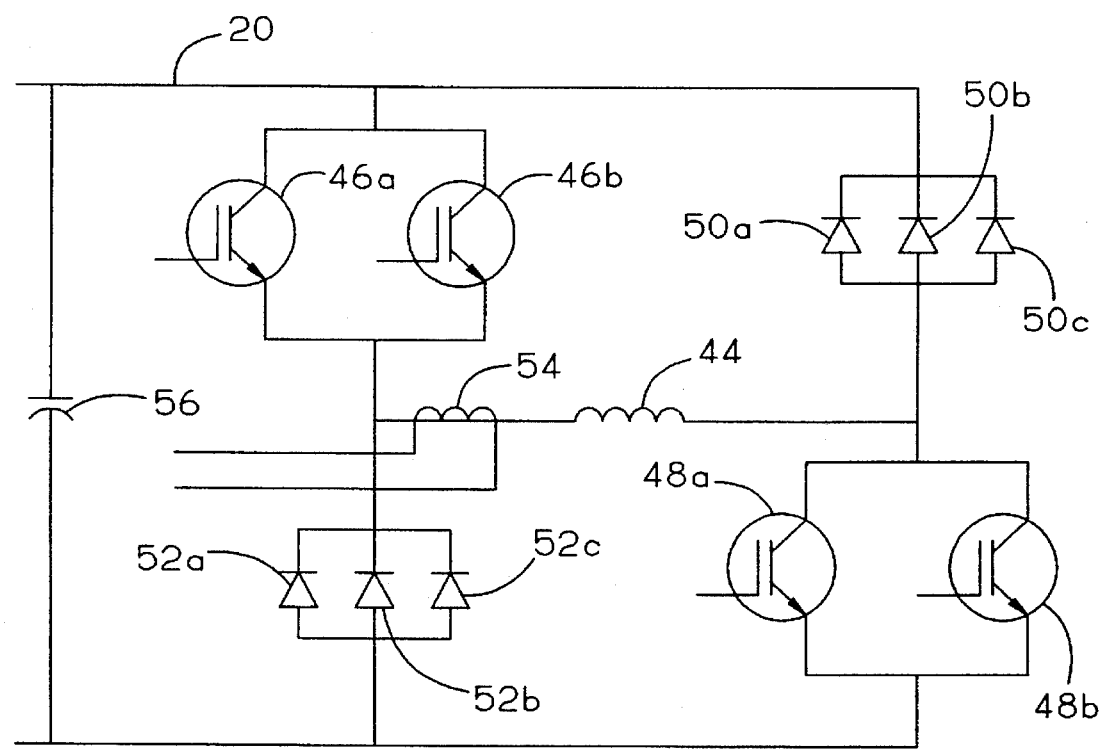
FIG. 4 is a single line topology diagram of one phase on an embodiment of the instant invention.

Preferably, the switches 46, 48 are insulated gate bipolar transistors (IGBTs), although other power switching devices such as MOS-controlled thyristors (MCT), static induction transistors (SITs), et cetera, may be use as appropriate. Currently, these switches have a rating of 600 volts and 300 amperes, and, therefore, two IGBTs 46a, 46b, and 48a, 48b (see FIG. 4) are used in parallel for higher power applications of the instant invention. The diodes are rated at 600 volts and 85 amperes, and, therefore, three diodes 50a, 50b, 50c, and 52a, 52b, 52c are used in parallel. Current sensing means, such as current sensor 54, having a bandwidth extending from dc to greater than 50 kHz, is included in each phase to provide feedback of the instantaneous phase current to the controller 22 (FIG. 1). A link capacitor bank 56, preferably comprising multilayer ceramic (MLC) capacitors, is used to meet extreme operating environment requirements. The system is capable of handling high di/dt values, which occur during turn on and turn off of the IGBTs 46a, 46b, and 48a, 48b, which is inherent with switch reluctance systems because of the low unaligned impedances in the machine.

Figure 5:
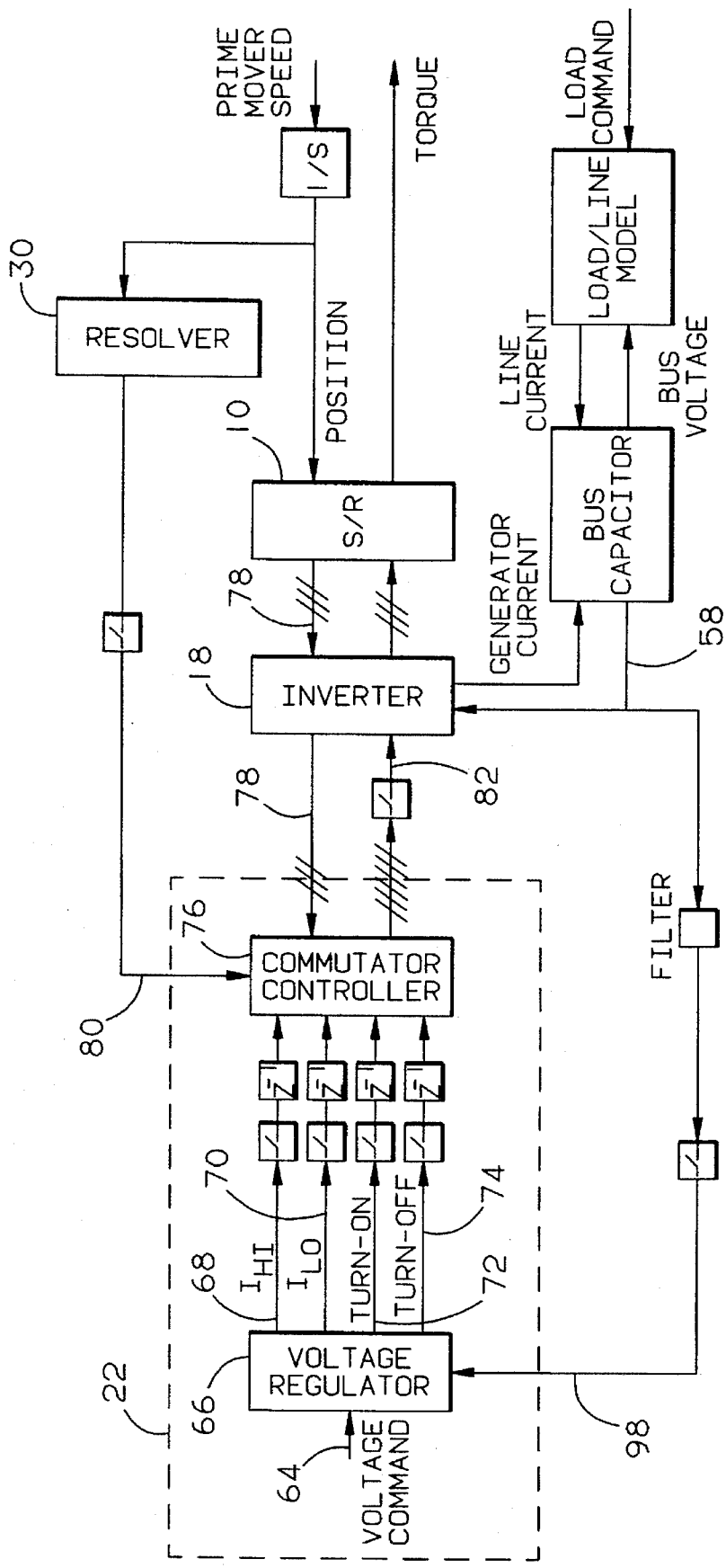
FIG. 5 is a control system block diagram of the instant invention.

Referring to FIG. 5, the controller 22 provides electric power generating system control and protection for all modes of operation including engine start and dc power generation. Within the controller 22 a voltage control module 66 processes the internal voltage command 64 and a voltage feedback signal 98 (generated by voltage sensing means 58) in the generate mode. The voltage control module 66 then communicates a maximum phase current, $I_{HI}$, control signal 68, a minimum phase current, $I_{LO}$, control signal 70, a turn-on control signal 72, and a turn-off control signal 74 to a current and commutator control module 76. This current and commutator control module 76 processes these signals 68, 70, 72, and 74, as well as the phase current feedback signals 78 (generated by current sensing means 28 of FIG. 1) and the angular position feedback signal 80 generated by the rotor position resolving means 30. The module 76 then generates switch commands 82 and transmits them to the inverter 18. The inverter 18 then configures the switches (not shown) to connect the phase voltage on lines 16 to the phase windings (not shown) of the switched reluctance machine 10.

In the generate mode, the control objective is to efficiently generate the necessary current to maintain the bus voltage within the parameters defined by the applicable power quality specification. The voltage control algorithm is capable of maintaining the voltage within these limits during load and speed transients with a load that can vary from resistive to constant power to regenerative. When the switched reluctance machine 10 is generating, the back emf may cause the phase current to increase above the commanded $I_{HI}$ even when both power switches 46, 48 (see FIG. 3) are turned off. This fact makes it difficult to apply an average torque per electrical cycle approach used in developing start mode algorithm such as are known in the art. If only angle control is used, the output current is very sensitive to small changes in turn-on and turn-off angles and poor voltage control results. The instant invention, however, fixes the turn-on and turn-off angles and uses the commanded current to control the output current. This approach results in a simple implementation, good efficiency, and acceptable variation in the plant transfer function in the speed and load range for the system.

Figure 6:
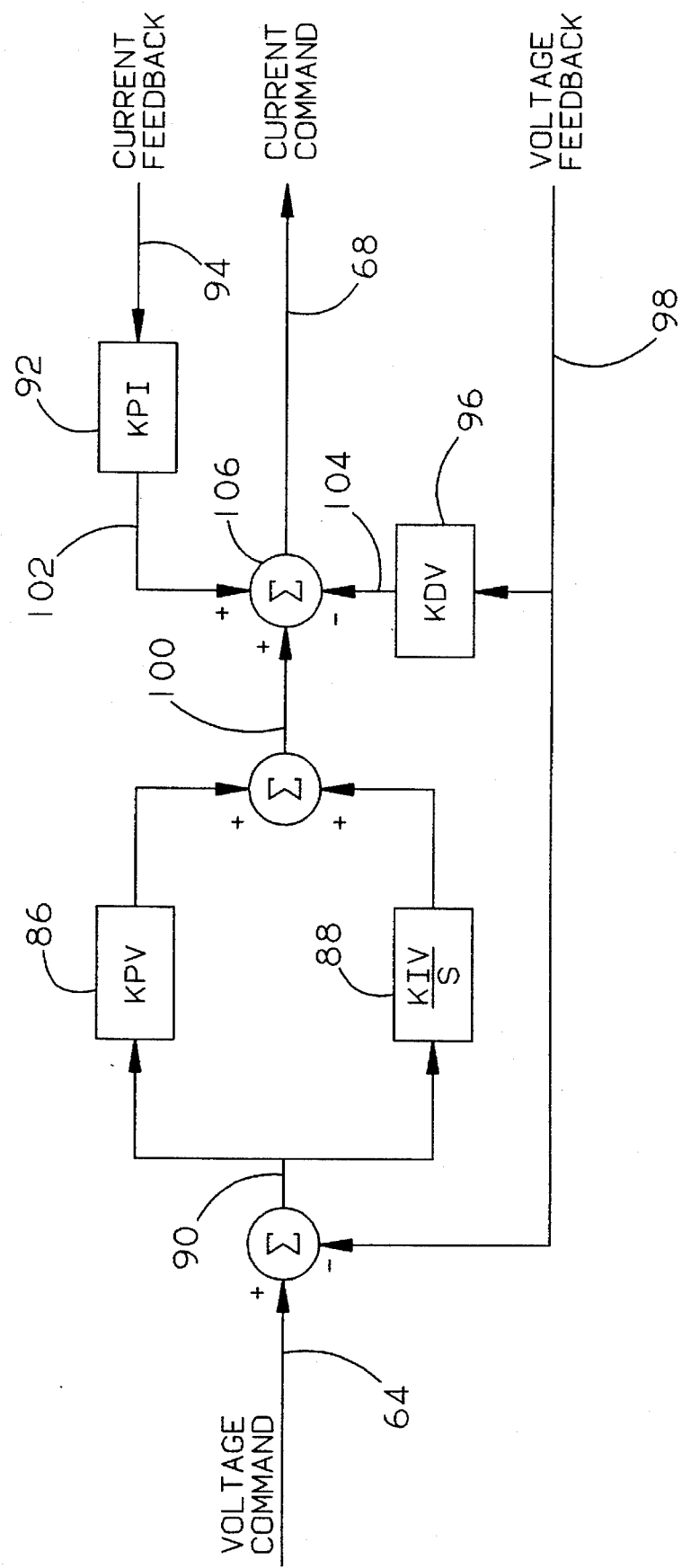
FIG. 6 is a control block diagram of the voltage controller of the instant invention.

As shown in FIG. 6, a proportional 86 plus integral 88 (P-I) control on the voltage error 90, which is developed as the voltage feedback 98 deviates from the commanded voltage 64 as a result of variations of the loading on the dc distribution bus, is used to generate a current command signal 100. This signal 100 is then summed with the output 102 of a proportional term 92 on the load current 94, and the output 104 of a proportional term 96 on the voltage feedback 98. The output of this summing junction 106 produces the maximum phase current, $I_{HI}$, control signal 68 which establishes the upper current limit for the generate control. The minimum current, $I_{LO}$, control signal (not shown) remains in a fixed proportion to the maximum phase current, $I_{HI}$, control signal 68 and defines the lower current limit for the generate control. In an embodiment of the instant invention supplying system loads having high input capacitance, a value of zero is used for the proportional terms KPI 92, and KDV 96.

Figure 7A:
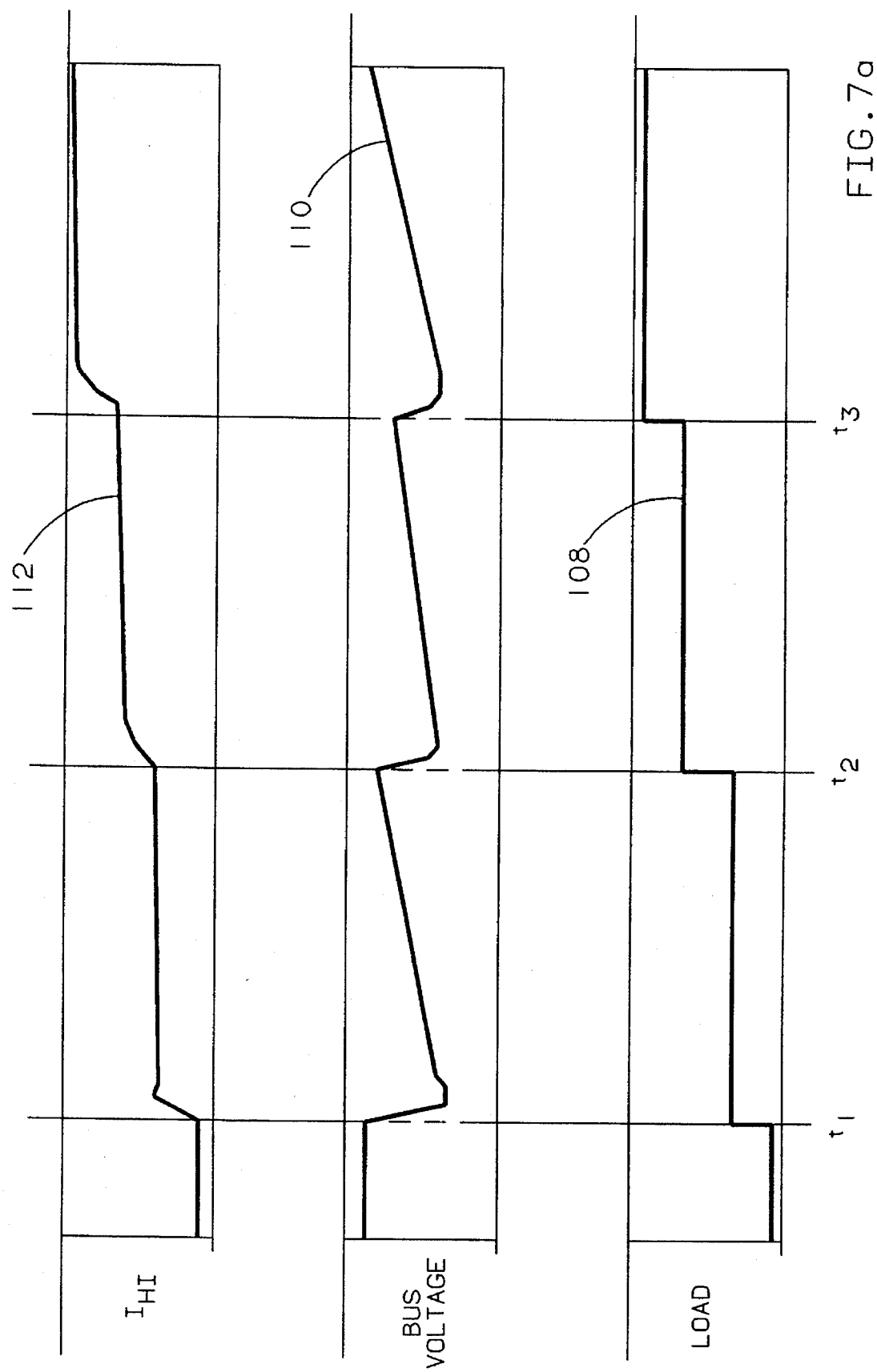
FIG. 7a is a load profile diagram illustrating the variable current control with increasing system load.

This control generates current commands which vary in magnitude to regulate the voltage on the dc bus. As more dissipative load is added to the system, the magnitude of $I_{HI}$ increases to allow the generation of more electric power to maintain the dc bus voltage at the desired level in light of the higher load. FIG. 7a shows this system response to increasing net load supplied by the switched reluctance machine. Trace 108 indicates the applied system load which is increased at time $t_1$. As shown by the dc bus voltage trace 110 which indicates the output voltage of the dc distribution bus coupled to the machine, the voltage droops as a result of the applied load at time $t_1$. Once the droop is sensed by the voltage controller 66 (see FIG. 5) the current command, trace 112, is increased, which increases the maximum current, $I_{HI}$, limit and hence the total amount of current generated by the machine, to allow recovery of the dc bus voltage. This pattern is repeated at times $t_2$ and $t_3$ as the net dissipative system load is increased still further.

Figure 7B:
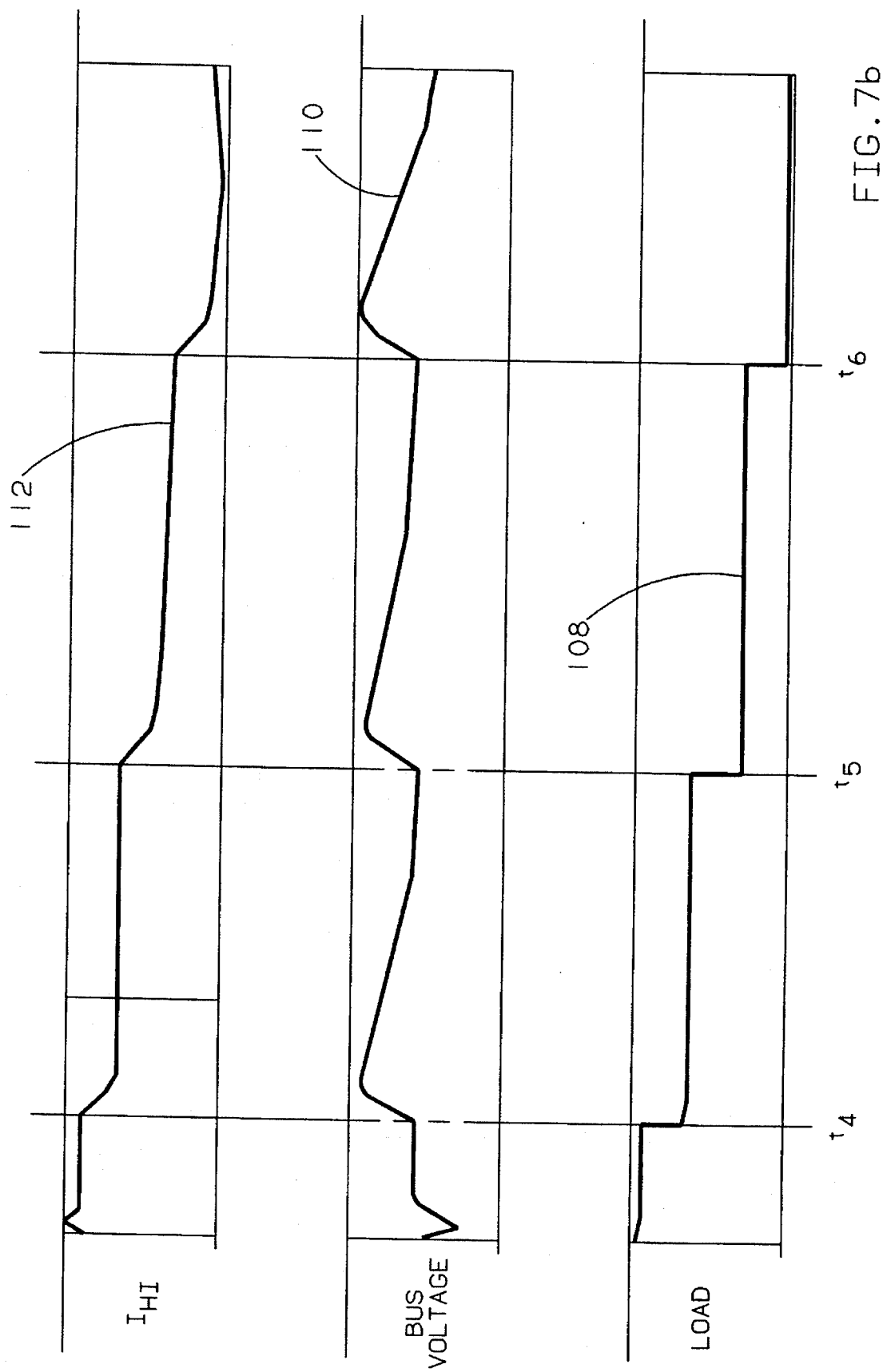
FIG. 7b is a load profile diagram illustrating the variable current control with decreasing system load.

As some of the dissipative load is removed, or if some regenerative loads are added to the system, the level of energy production will exceed the demand. If no action is taken by the controller, the voltage on the dc bus will rise and potentially damage some of the utilization equipment coupled to the dc bus. To compensate for this net lighter load, the magnitude of $I_{HI}$ is decreased to reduce the amount of electrical energy the switched reluctance machine is allowed to produce. In this way, the voltage on the dc bus remains at the desired level, despite the net lower electrical load. FIG. 7b illustrates the system response to decreases in the total load supplied by the switched reluctance machine. Trace 108 indicates the applied system load which is decreased at time $t_4$. As shown by the dc bus voltage trace 110 which indicates the output voltage of the dc distribution bus coupled to the machine, the voltage increases as a result of the load removal at time $t_4$. Once the increase is sensed by the voltage controller 66 (see FIG. 5) the current command, trace 112, is decreased, which decreases the maximum current, $I_{HI}$, limit and hence the total amount of current generated by the machine, to allow recovery of the dc bus voltage. This pattern is repeated at times $t_5$ and $h_6$ as the net dissipative system load is decreased still further.

Figure 7C:
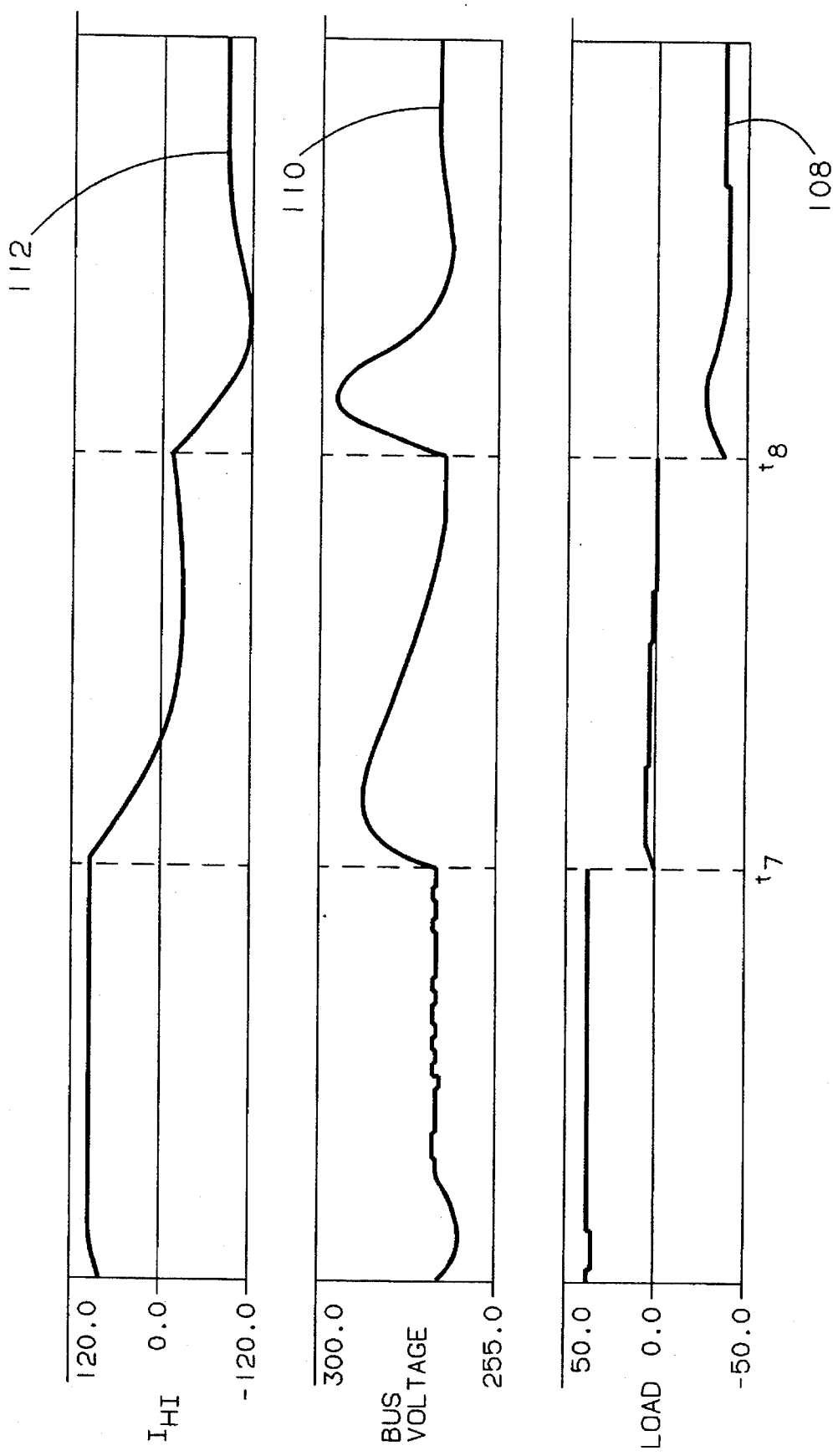
FIG. 7c is a load profile diagram illustrating the variable current control with increasing net regenerative system load.

However, if the magnitude of the regenerative load exceeds the magnitude of the dissipative load connected to the dc bus, a simple reduction in output electrical power generation will no longer be able to compensate for the net positive power production by the regenerative load. In order to maintain the dc bus voltage at the desired level therefore, the switched reluctance machine must actually remove power from the dc bus. FIG. 7c illustrates the system response to this condition. Trace 108 indicates the applied system load which is decreased at time 17 (due to an actual decrease in dissipative load or an increase in regenerative load). As shown by the dc bus voltage trace 110 which indicates the output voltage of the dc distribution bus coupled to the machine, the voltage increases as a result of the dissipative load removal (or regenerative load addition) at time $t_7$. Once the increase is sensed by the voltage controller 66 (see FIG. 5) the current command, trace 112, is decreased, which decreases the maximum current, $I_{HI}$, limit and hence the total amount of current generated by the machine, to allow recovery of the dc bus voltage. At time $t_8$ the magnitude of the regenerative load exceeds the magnitude of the dissipative load as indicated by trace 108 becoming negative (indicating a net positive power flow from the connected load). As shown by the dc bus voltage trace 110, the voltage increases as a result of the regenerative load addition at time $t_8$. Once the increase is sensed by the voltage controller 66 (see FIG. 5) the current command trace 112 is decreased and actually becomes negative. This, in turn, decreases the maximum current limit, $I_{HI}$, and changes its sign as well. This change of sign indicates that a net negative current flow must be generated by the switched reluctance machine to allow recovery of the dc bus voltage.

As indicated above, in response to a positive magnitude $I_{HI}$ the turn-on angle is fixed in the instant invention before alignment, and regulation of the dc distribution bus voltage is achieved by varying a current control band. Preferably, the turn-on angle is fixed at approximately 40 electrical degrees before alignment of the stator and rotor pole (see FIG. 2). The turn-off angle is also fixed in the instant invention after alignment when the maximum phase current control signal is positive. Preferably, the angle is fixed at approximately 120 electrical degrees after alignment. By fixing the turn-on and turn-off angles and controlling the phase current as a function of the dc bus voltage within an adjustable band, the need for a high speed, high resolution resolver to precisely monitor the turn-on and turn-off angles is eliminated with no reduction in the regulation power quality.

Figure 8A:
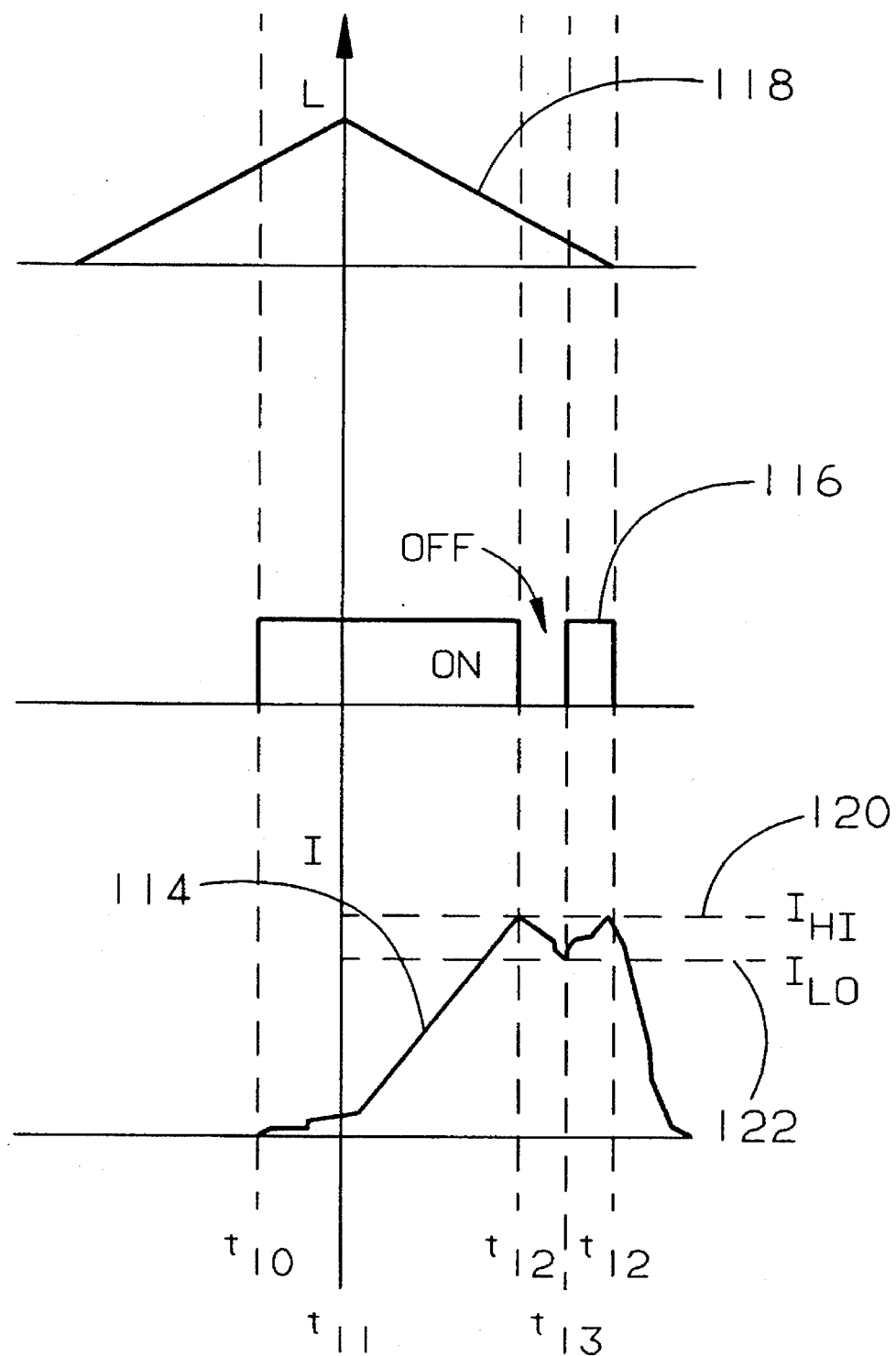
FIG. 8a is a control signal diagram illustrating the system generate mode control for a heavy net dissipative loading condition.

FIG. 8a illustrates the fixed angle, adjustable current band control of the instant invention for a given speed and a high dissipative system load (positive $I_{HI}$). As the inductance increases due to the rotor and stator poles coming into alignment, as indicated by trace 118, both power switches 46, 48 (see FIG. 3) are turned on at time $t_{10}$ at a fixed angle of approximately 40 electrical degrees before alignment, as indicated by trace 116, and current is established in the phase winding 44 (FIG. 3), as indicated by trace 114. As the poles align at time $t_{11}$ and begin to move away from alignment, the inductance 118 begins decreasing and the back emf aids the applied bus voltage in increasing the phase current 114. When the phase current 114 reaches the maximum phase current limit $I_{HI}$ 120 at time $t_{12}$, both switches 46, 48 (see FIG. 3) are turned off 116, the back emf opposes the bus voltage, and current is forced to commutate through the diodes 50, 52 (see FIG. 3) back to the dc bus 20 (see FIG. 3). If the phase current 114 decays to the minimum phase current limit $I_{LO}$ 122, as indicated in FIG. 8a at time $t_{13}$, both switches are again turned on to maintain the phase current 114 within the range defined by these two limits 120, 122. At time $t_{14}$ however, the rotor and stator poles have reached the fixed turn-off angle after alignment, both switches are disabled, and the phase current 114 rapidly decays.

Figure 8B:
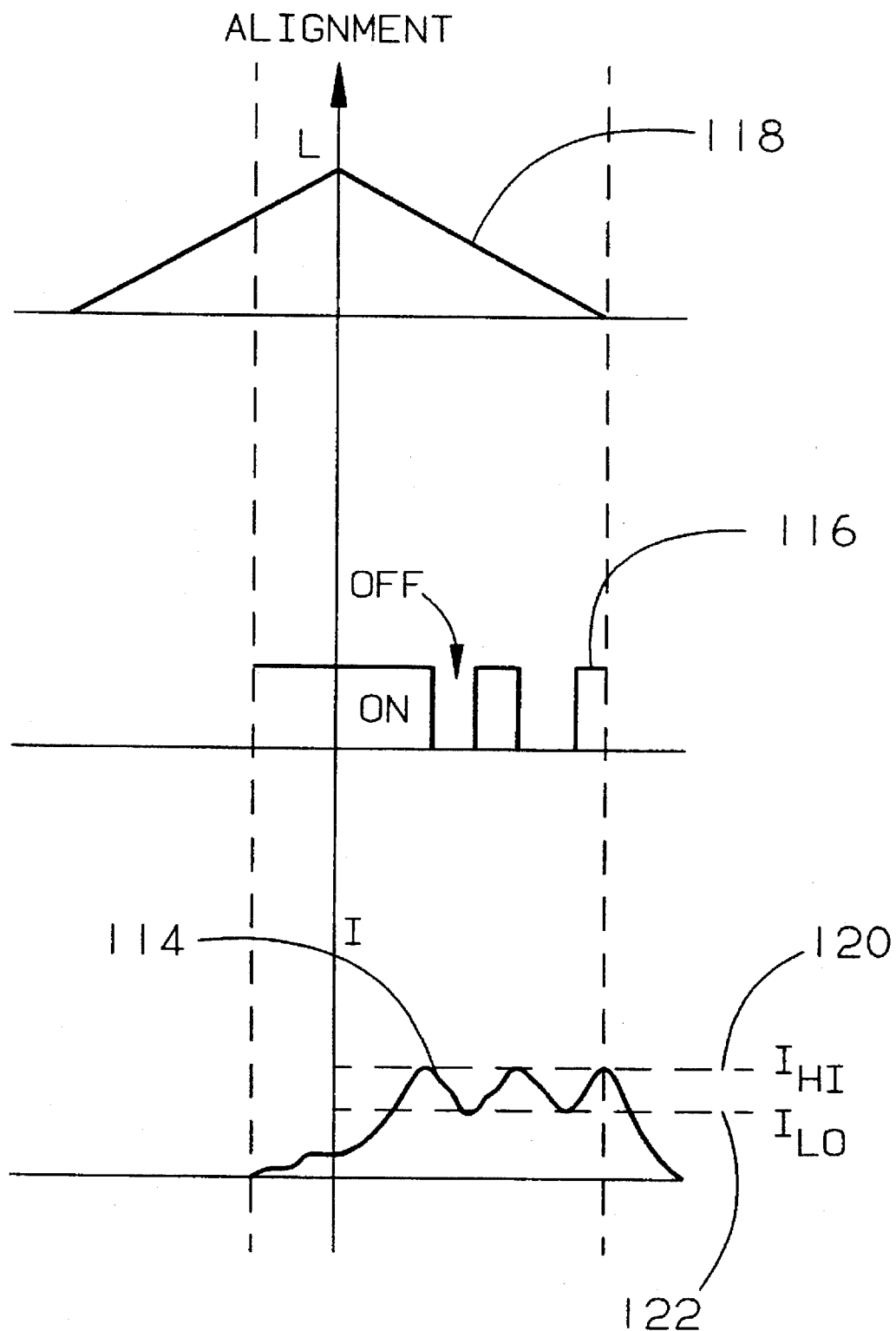
FIG. 8b is a control signal diagram illustrating the system generate mode control for a medium net dissipative loading condition.
Figure 8C:
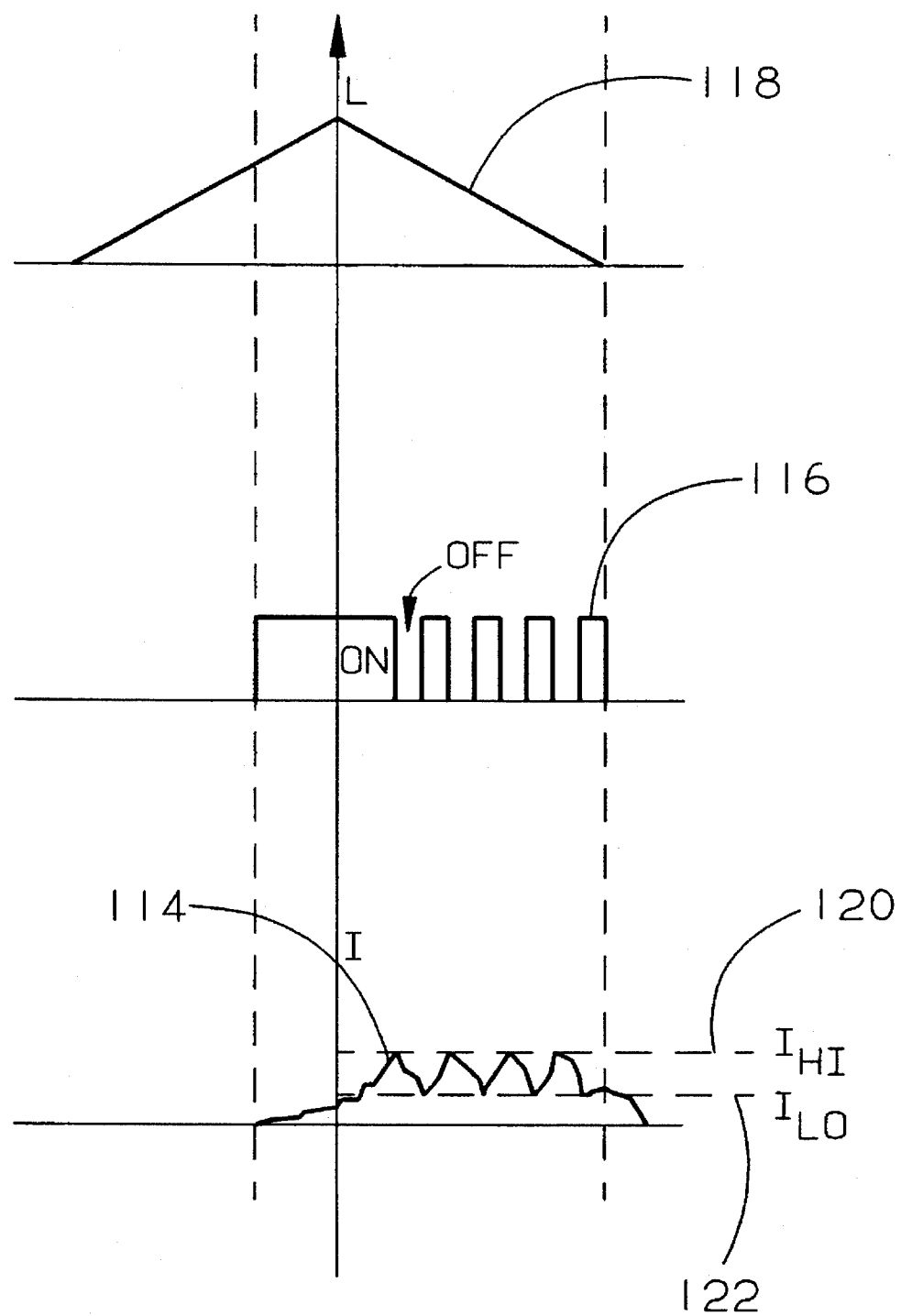
FIG. 8c is a control signal diagram illustrating the system generate mode control for a light net dissipative loading condition.

FIG. 8b illustrates the same control method during a net smaller dissipative connected loading condition (less dissipative load or an addition of a regenerative load) at the same speed. In this situation, the power switches 46, 48 (see FIG. 3) are still enabled at the same fixed angle prior to alignment, and disabled at the same fixed angle after alignment as with the heavier loaded condition, but the maximum, $I_{HI}$, 120 and minimum, $I_{LO}$, 122 phase current control signal limits have been reduced with the net smaller connected load. As a result, the switches 46, 48 (see FIG. 3) must be turned off and back on (modulated) more often, as indicated by trace 116, to maintain the phase current 114 within the range defined by the lowered limits 120, 122 to maintain the dc bus voltage at the desired level. This pattern continues as the net dissipative connected load is reduced still further (due either to less connected dissipative load or the addition of a larger regenerative load) at a given speed as indicated by FIG. 8c.

Once the net dissipative load is reduced to zero, further addition of regenerative load will result in a negative loading condition (power generation by the load), and a negative phase current control signal, $-I_{HI}$. In response to this negative sign, the controller changes control modes to provide a controlled dissipation of power from the dc bus to maintain the bus voltage in light of the negative loading condition. Since the switched reluctance machine and inverter are designed to convert mechanical power from the prime mover to electric power for the maximum rated dissipative electrical load, it is also able to convert the maximum excess rated electrical power from the regenerative loads to mechanical power using a quasi-motoring commutation scheme. This transformation of electric power to mechanical power reduces the torque required from the prime mover, and, as more regenerative load is added to the system, the energy transformation may actually aid the prime mover. In order to control the conversion of regenerated electrical power to mechanical power, however, it is desirable to obtain a linear between the control variable(s) and the power convened. The simplest approach obtaining such a relationship is to fix the control angles and control the amount of power that is converted from electrical power to mechanical power by controlling the current command. This control approach is different than a true motoring commutation scheme where the control objective is to obtain a linear relationship between the control variable(s) and the torque by varying the control angles as a function of speed, bus voltage, and current command.

Figure 8D:
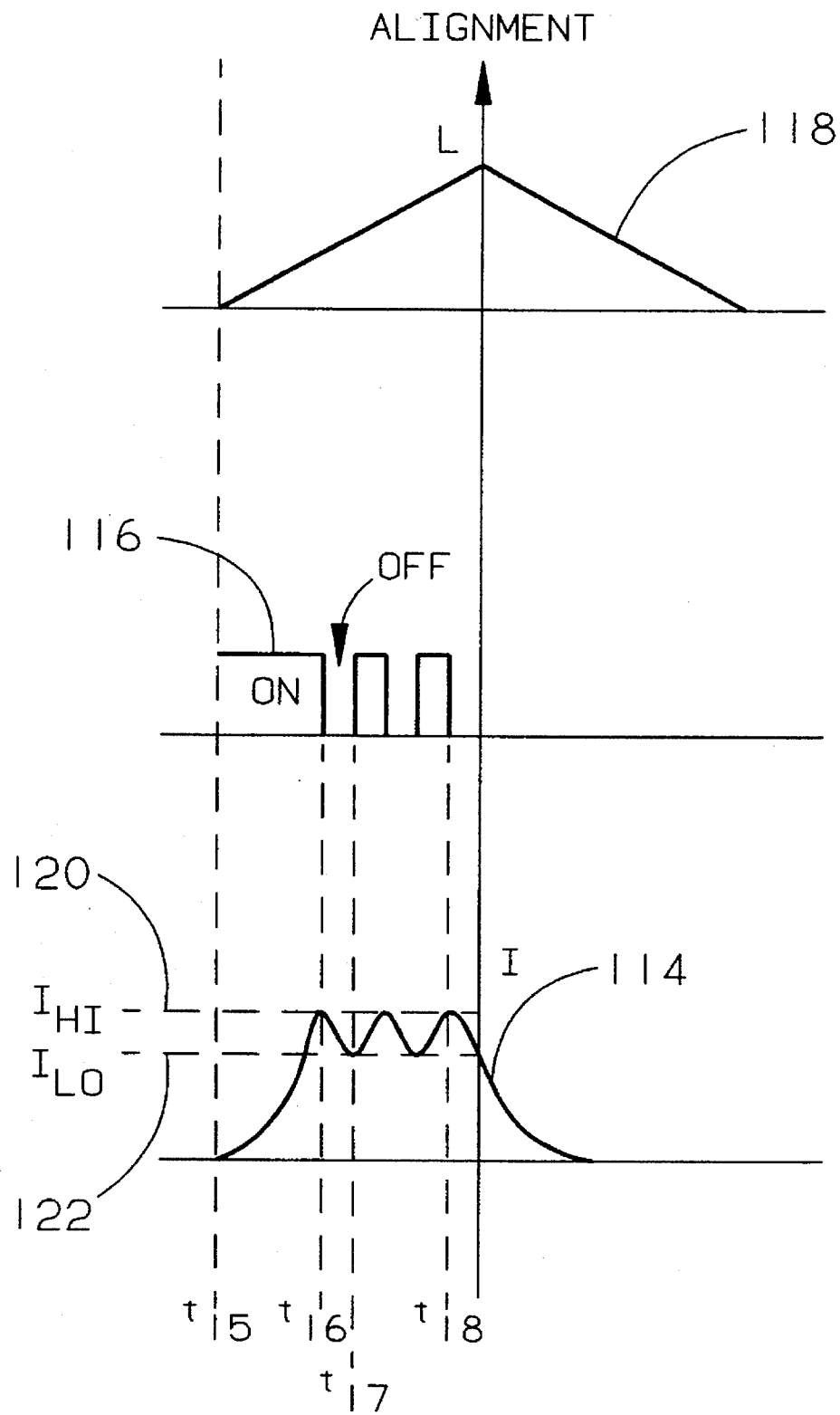
FIG. 8d is a control signal diagram illustrating the system generate mode control for a light net regenerative loading condition.
Figure 9:
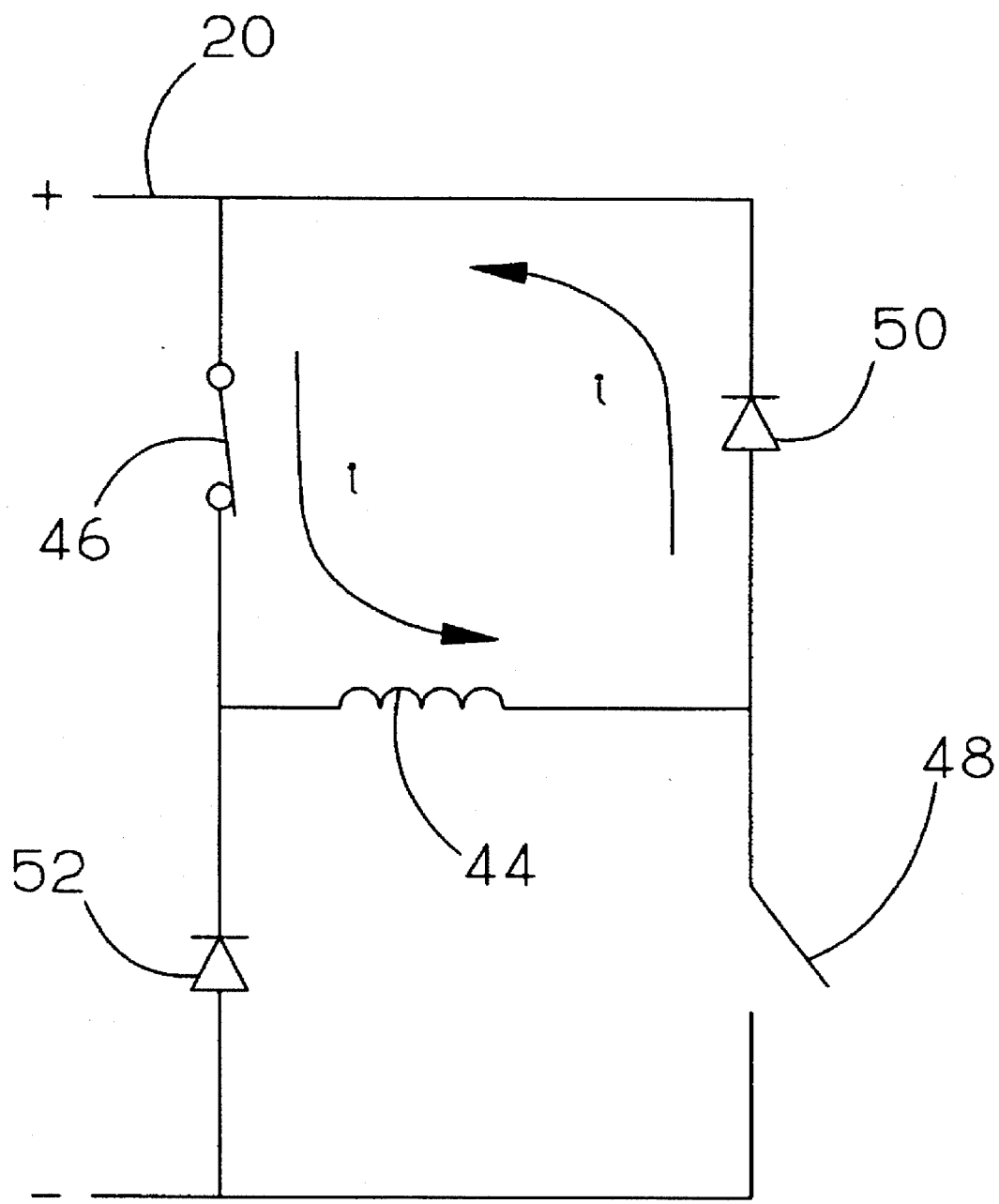
FIG. 9 is an electric schematic diagram of one phase on an embodiment of the instant invention during operation with a net regenerative system load.

FIG. 8d illustrates this regenerative power dissipation commutation scheme used by the controller once a negative phase current control signal $I_{HI}$ has been calculated. This negative phase current control signal is represented by the controller as a magnitude level existing in the second quadrant for control purposes. As the inductance begins to increase due to the rotor and stator poles beginning to come into alignment, as indicated by trace 118, both power switches 46, 48 (see FIG. 3) are turned on at time $t_{15}$ at a fixed angle of approximately 200 electrical degrees prior to alignment, as indicated by trace 116, and current is established in the phase winding 44 (see FIG. 3), as indicated by trace 114. When the phase current 114 reaches the maximum phase current limit $I_{HI}$ at time $t_{16}$, switch 48 is turned off 116. In this way, as shown in FIG. 9, the current flowing in the phase winding 44 is allowed to decay through diode 50 and switch 46. As the current decays to the minimum phase current limit $I_{LO}$, as indicated in FIG. 8d at time $t_{17}$, switch 48 is again turned on to allow current to flow from the dc bus. This modulation of switch 48 continues until the fixed turn off angle of approximately 40 electrical degrees prior to alignment is reached at time $t_{18}$ at which point both switches 46 and 48 are disabled. As the amount of regenerative load is further increased, the maximum phase current limit $I_{HI}$ is varied, the turn on and turn off angles remain fixed, and switch 48 is modulated to regulate the phase current within the current control band defined between $I_{HI}$ and $I_{LO}$ as described above.

Further in accordance with a preferred embodiment of the instant invention, a method of controlling a switched reluctance machine 10 (see FIG. 1) to allow operation as a generator producing electric power in the presence of a net dissipative load and dissipating electric power in the presence of a net regenerative load comprises the steps of: (1) monitoring the voltage on the dc power bus 20 at a point of regulation; (2) calculating a maximum phase current control signal and a minimum phase current control signal based on the voltage on the dc power bus 20; (3) when the maximum phase current control signal is a positive value: (a) enabling the power switches 46, 48 (see FIG. 3) for a selected phase winding 44 to allow excitation current flow from the dc power bus 20 to energize the selected phase winding 44 at a first fixed angle prior to alignment of a rotor pole with the energized stator pole, and (b) disabling the power switches 46, 48 (see FIG. 3) to allow generation current flow through the diodes 50, 52, to the dc power bus 20 at a second fixed angle after alignment of the rotor pole with the energized stator pole; (4) when said maximum phase current control signal is a negative value: (a) enabling the switches 46, 48 for a selected phase winding 44 to allow dissipation current flow from the dc power bus 20 to the selected phase winding 44 at a third fixed angle prior to alignment of a rotor pole with the selected stator pole; and (b) disabling the switches 46, 48 at a fourth fixed angle prior to alignment of the rotor pole with the selected stator pole; and (5) regulating the voltage on the dc power bus 20 by modulating the switches (both switches 46 and 48 for positive maximum current control signal and only switch 48 for negative maximum current control signal) to control the generation and dissipation current flow within the variable limits defined by said maximum phase current control signal and said minimum phase current control signal.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A controller for a switched reluctance machine having a rotor drivably coupled to a prime mover by shaft means, and a stator having a first plurality of salient stator poles wound with phase windings, the rotor comprising a second plurality of salient rotor poles, the phase windings being coupled to a dc bus by at least a first and a second switching means responsive to switching control signals, the windings further being cross coupled to the dc bus by at least a first and a second commutation means to allow current flow back when the switching means are disabled, comprising:

means for sensing voltage on the dc bus, said voltage sensing means generating a voltage feedback signal proportional in magnitude to said voltage on the dc bus;

means for sensing current flowing in the phase windings, said current sensing means generating a phase current feedback signal proportional in magnitude to said current flowing in the phase winding;

means for resolving the position of the rotor, said rotor position resolving means generating an angular position feedback signal proportional to the angular displacement between a rotor pole and a stator pole;

voltage control means responsive to said voltage feedback signal and a predetermined voltage command threshold for generating a variable maximum phase current control signal and a variable minimum phase current control signal, a fixed turn-on control signal and a fixed turn-off control signal;

commutator control means responsive to said variable maximum phase current control signal, said variable minimum phase current control signal, said fixed turn-on control signal, said fixed turn-off control signal, said phase current feedback signal, and said angular position feedback signal for generating the switching control signals to modulate the switching means during a period from said fixed turn-on control signal to said fixed turn-off control signal, said commutator control means thereby regulating said phase current within a range defined by said variable maximum phase current control signal and said variable minimum phase current control signal, said voltage on the dc bus being maintained at a desired level thereby; and wherein said voltage control means, upon generating a positive maximum phase current control signal, generates said fixed turn-on control signal at a first fixed angle prior to alignment of a rotor pole with a stator pole, and said fixed turn-off control signal at a second fixed angle after alignment of a rotor pole with a stator pole; and wherein said voltage control means, upon generating a negative maximum phase current control signal, generates said fixed turn-on control signal at a third fixed angle prior to alignment of a rotor pole with a stator pole, and said fixed turn-off control signal at a fourth fixed angle prior to alignment of a rotor pole with a stator pole.

2. An electric power generating system for converting mechanical energy from a prime mover to electrical energy, the electrical energy being distributed by a dc bus to utilization equipment for use thereby, comprising:

a switched reluctance machine having a rotor drivably coupled to the prime mover by shaft means, and a stator having a first plurality of salient stator poles wound with phase windings, said rotor comprising a second plurality of salient rotor poles;

an inverter having a dc input/output coupled to the dc bus, and at least a first and a second switching means responsive to switching control signals for coupling each of said phase windings to the dc bus, and at least a first and a second commutation means for crosscoupling each of said phase windings to the dc bus to allow current flow back when said switching means are disabled;

controller means having a plurality of control inputs and outputs coupled to said inverter for monitoring and controlling system performance; and wherein said controller means continuously monitors current flowing in said phase windings and voltage level on the dc bus, said controller means calculating a variable maximum phase current control signal and a variable minimum phase current control signal therefrom; and wherein said controller means modulates said switching control signals to regulate said phase current within a range defined by said variable maximum phase current control signal and said variable minimum phase current control signal, said controller means maintaining said voltage level on the dc bus at a desired level thereby; and wherein said controller means, upon calculating a positive maximum phase current control signal, generates said switching control signals to enable at least said first and said second switching means for each of said phase windings at a first fixed angle prior to alignment of said rotor pole with said phase winding's associated stator pole, said controller further generating said switching control signals to disable at least said first and said second switching means at a second fixed angle after alignment of said rotor pole with said phase winding's associated stator pole, said switched reluctance machine generating sufficient electric power thereby to maintain said voltage level on the dc bus at said desired level; and wherein said controller means, upon calculating a negative maximum phase current control signal, generates said switching control signals to enable at least said first and said second switching means for each of said phase windings at a third fixed angle prior to alignment of said rotor pole with said phase winding's associated stator pole, said controller means further generating said switching control signals to disable at least said second switching means at a fourth fixed angle prior to alignment of said rotor pole with said phase winding's associated stator pole, said switched reluctance machine dissipating an amount of electric power thereby sufficient to maintain said voltage level on the dc bus at said desired level.

3. An electric power electric power generating system as recited in claim 2, wherein said maximum phase current control signal varies as a function of said dc bus voltage sense signal.

4. An electric power electric power generating system as recited in claim 2, wherein said minimum phase current control signal varies in fixed proportion to said maximum phase current control signal.

5. An electric power electric power generating system as recited in claim 2, wherein said maximum phase current control signal increases as said dc bus voltage sense signal decreases below a set value corresponding to a desired bus voltage.

6. An electric power electric power generating system as recited in claim 2, wherein said controller means utilizes proportional integral control to generate said maximum phase current control signal.

7. An electric power electric power generating system as recited in claim 2, wherein said switching means are insulated gate bi-polar transistors.

8. An electric power electric power generating system as recited in claim 2, wherein said switching means are static induction transistors.

9. An electric power electric power generating system as recited in claim 2, wherein said switching means are MOS-controlled thyristors.

10. A method of controlling a switched reluctance machine to allow operation as a generator producing electric power in the presence of a net dissipative load, and dissipating electric power in the presence of a net regenerative load, the machine having a salient pole rotor drivably coupled to a prime mover by shaft means, and a multi-phase, multi-pole wound salient pole stator having its phase windings switchably coupled to a dc power bus by switching means having cross coupled commutation means, comprising the steps of:

monitoring the voltage on the dc power bus at a point of regulation;

comparing the voltage on the dc power bus with a predetermined voltage command threshold to determine a voltage error;

calculating a maximum phase current control signal and a minimum phase current control signal based on the voltage error, said maximum phase current control signal and said minimum phase current control signal representing an amount of current required to minimize the voltage error; and when said maximum phase current control signal is a positive value, enabling the switching means for a selected phase winding to allow excitation current flow from the dc power bus to energize the selected phase winding at a first fixed angle prior to alignment of a rotor pole with the energized stator pole; and disabling the switching means to allow generation current flow through the commutation means to the dc power bus at a second fixed angle after alignment of the rotor pole with the energized stator pole; and when said maximum phase current control signal is a negative value, enabling the switching means for a selected phase winding to allow dissipation current flow from the dc power bus to the selected phase winding at a third fixed angle prior to alignment of a rotor pole with the selected stator pole; and disabling the switching means at a fourth fixed angle prior to alignment of the rotor pole with the selected stator pole; and regulating the voltage on the dc power bus by modulating the switching means to control the generation and dissipation current flow within the variable limits defined by said maximum phase current control signal and said minimum phase current control signal.

11. A method of controlling a switched reluctance machine to allow operation as a generator to produce electric power in the presence of a net dissipative load and to dissipate electric power in the presence of a net regenerative load, the machine having a salient pole rotor drivably coupled to an engine by shaft means, and a multi-phase, multi-pole wound salient pole stator having its phase windings switchably coupled to adc power bus by switching means and by commutation means to allow generation current flow and dissipation current flow, comprising the steps of:

calculating a maximum phase current control signal and a minimum phase current control signal based on the dc power bus voltage deviation from a predetermined voltage command threshold said maximum phase current control signal and said minimum phase current control signal representing an amount of current required to minimize said dc power bus voltage deviation;

enabling the switching means for a selected phase winding for a first period beginning at a first fixed angle prior to alignment of a rotor pole with the selected stator pole and ending at a second fixed angle after alignment of the rotor pole with the selected stator pole when said maximum phase current control signal is positive;

enabling the switching means for a selected phase winding for a second period beginning at a third fixed angle prior to alignment of a rotor pole with the selected stator pole and ending at a fourth fixed angle after alignment of the rotor pole with the selected stator pole when said maximum phase current control signal is negative; and modulating the switching means during said first period and said second period to maintain the generation and dissipation current flow within the range defined by said maximum phase current control signal and said minimum current control signal.

* * * * *